(12) United States Patent
Mann

(10) Patent No.: US 10,638,585 B2
(45) Date of Patent: Apr. 28, 2020

(54) ASSOCIATING WIRELESS CONTROL DEVICES

(71) Applicant: Lutron Technology Company LLC, Coopersburg, PA (US)

(72) Inventor: Timothy Mann, Quakertown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 16/443,814

(22) Filed: Jun. 17, 2019

(65) Prior Publication Data

US 2019/0306961 A1 Oct. 3, 2019

Related U.S. Application Data

(60) Continuation of application No. 16/253,846, filed on Jan. 22, 2019, which is a continuation of application No. 16/119,502, filed on Aug. 31, 2018, now Pat. No. 10,212,794, which is a division of application No. 15/167,381, filed on May 27, 2016, now Pat. No. 10,070,504.

(60) Provisional application No. 62/168,296, filed on May 29, 2015.

(51) Int. Cl.
| | |
|---|---|
| *H05B 47/19* | (2020.01) |
| *H04L 12/28* | (2006.01) |
| *H04L 12/66* | (2006.01) |
| *H04W 4/80* | (2018.01) |
| *H05B 47/11* | (2020.01) |
| *H05B 47/105* | (2020.01) |

(52) U.S. Cl.
CPC ........... *H05B 47/19* (2020.01); *H04L 12/283* (2013.01); *H04L 12/2816* (2013.01); *H04L 12/66* (2013.01); *H04W 4/80* (2018.02); *H05B 47/105* (2020.01); *H05B 47/11* (2020.01)

(58) Field of Classification Search
CPC .... G08C 19/28; G08C 17/02; G08C 2201/20; G08C 2201/92; G08C 17/00; G08C 23/04; G08C 2201/93; G08C 2201/40; G08C 2201/21; G08C 2201/30
USPC ...................................... 340/12.29
See application file for complete search history.

(56) References Cited

U.S. PATENT DOCUMENTS

| | | |
|---|---|---|
| 7,573,208 B2 | 8/2009 | Newman, Jr. |
| 8,008,866 B2 | 8/2011 | Newman, Jr. et al. |
| 8,009,042 B2 | 8/2011 | Steiner et al. |
| 8,199,010 B2 | 6/2012 | Sloan et al. |

(Continued)

*Primary Examiner* — Mark S Blouin
(74) *Attorney, Agent, or Firm* — Condo Roccia Koptiw LLP

(57) ABSTRACT

A load control system may include one or more wireless control devices that may be associated via a programming device. An identifier for a first wireless control device may be determined in response to an actuation of a button on the first wireless control device. An association between the first wireless control device and a second wireless control device may be defined at the programming device. The identifier for the first wireless control device may be transmitted to the second wireless control device, which may cause the first wireless control device to enter a sleep mode. The first wireless control device may enter the sleep mode after an actuation of a button on the first wireless control device. The identifier may be determined in response to the actuation of the button on the first wireless control device and/or prior to the first wireless control device entering the sleep mode.

22 Claims, 9 Drawing Sheets

(56) References Cited

U.S. PATENT DOCUMENTS

| | | | |
|---|---|---|---|
| 8,228,184 B2 | 7/2012 | Blakeley et al. | |
| 8,330,638 B2 | 12/2012 | Altonen et al. | |
| 8,410,706 B2 | 4/2013 | Steiner et al. | |
| 8,451,116 B2 | 5/2013 | Steiner et al. | |
| 9,538,619 B2 | 1/2017 | Swatsky et al. | |
| 9,590,427 B2 * | 3/2017 | Davis | H05B 37/0272 |
| 2006/0154598 A1 | 7/2006 | Rudland et al. | |
| 2008/0111491 A1 | 5/2008 | Spira | |
| 2008/0218099 A1 | 9/2008 | Newman | |
| 2011/0050451 A1 | 3/2011 | Mierta | |
| 2011/0314163 A1 | 12/2011 | Borins et al. | |
| 2012/0056712 A1 | 3/2012 | Knode | |
| 2012/0286689 A1 | 11/2012 | Newman, Jr. et al. | |
| 2013/0030589 A1 | 1/2013 | Pessina et al. | |
| 2014/0117871 A1 | 5/2014 | Swatsky et al. | |
| 2014/0265568 A1 | 9/2014 | Crafts et al. | |
| 2015/0051717 A1 | 2/2015 | Krutsch et al. | |
| 2015/0137699 A1 | 5/2015 | Killo et al. | |
| 2015/0371534 A1 | 12/2015 | Dimberg et al. | |

* cited by examiner

ASSOCIATING WIRELESS CONTROL DEVICES

CROSS-REFERENCE TO RELATED APPLICATIONS

This application is a continuation of U.S. patent application Ser. No. 16/253,846, filed Jan. 22, 2019, which is a continuation of U.S. patent application Ser. No. 16/119,502, filed Aug. 31, 2018, now U.S. Pat. No. 10,212,794, issued on Feb. 19, 2019, which is a divisional of U.S. patent application Ser. No. 15/167,381, filed on May 27, 2016, now U.S. Pat. No. 10,070,504, issued on Sep. 4, 2018, which claims the benefit of U.S. Provisional Patent Application No. 62/168,296, filed May 29, 2015, the entire disclosures of which are hereby incorporated by reference herein as if fully set forth.

BACKGROUND

In order to reduce energy consumption, the use of high-efficiency light sources (e.g., gas discharge lamps, such as compact fluorescent lamps (CFL), and light-emitting diode (LED) light sources) is increasing, while the use of low-efficiency light sources (e.g., incandescent lamps or halogen lamps) is decreasing. Many consumers are replacing older screw-in incandescent lamps with screw-in high-efficiency lamps to provide a quick path to reducing energy consumption. A screw-in high-efficiency lamp includes a light source (e.g., a CFL tube or LED light engine) and an integral load regulation circuit (e.g., a ballast circuit or an LED drive circuit) housed in a base of the high-efficiency lamp. The high-efficiency lamp receives an alternating-current (AC) voltage from an AC power source and the load regulation circuit regulates at least one of a load voltage generated across the light source and a load current conducted through the light source. In most installations, the screw-in high-efficiency lamp may be turned on and off by actuating a light switch coupled between the AC power source and the high-efficiency lamp. Many screw-in high-efficiency lamps may be dimmed by a dimmer switch that replaces the light switch.

Some screw-in high-efficiency lamps now also include integral wireless receivers, e.g., radio-frequency (RF) receivers, for receiving wireless signals, e.g., RF signals, from a remote control device, such that the screw-in high-efficiency may be turned on and off and dimmed in response to the remote control device. For example, the RF signals may be transmitted using a standard RF communication protocol, such as, the communication protocol defined by the Zigbee standard. In order to control a high-efficiency lamp having an RF receiver, most remote control devices must first be associated with the high-efficiency lamp, such that the high-efficiency lamp is responsive to the wireless signals transmitted by the remote control devices. For example, the high-efficiency lamp may store unique identifiers (such as serial numbers, previous access network identifiers (PANIDs), network identifiers, and/or group identifiers) of one or more remote control devices and may respond to wireless signals including the unique identifiers to which the high-efficiency lamp is associated. An example of a prior art association procedure is described in greater detail in U.S. Patent Application Publication No. 2008/0111491, published May 15, 2008, entitled RADIO-FREQUENCY LIGHTING CONTROL SYSTEM, and U.S. Patent Application Publication No. 2014/0265568, published Sep. 18, 2014, entitled COMMISSIONING LOAD CONTROL SYSTEMS, the entire disclosures of which are hereby incorporated by reference.

A remote control operating according to the Zigbee standard may be associated to a load control device (e.g., a controllable lamp) using a number of different procedures. For example, according to the Zigbee Light Link standard, a user may move the remote control close to controllable lamp and actuate a button on the remote control in order to associate the remote control with the controllable lamp.

In addition, a user may associate the remote control with the controllable lamp using a network device, such as a hub or a smart phone, according to the Zigbee Home Automation Standard. The smart phone may communicate with a home automation bridge, for example, using Wi-Fi technology. The home automation bridge may communicate with the remote control and the controllable lamp according to the Zigbee standard in order to associate the remote control with the controllable lamp.

FIG. 1 is a flowchart of a prior art association procedure 100 for associating a remote control with a load control device (such as a controllable lamp) using a programming device (such as a smart phone) according to the Zigbee standard. The method may begin at 102. At 104, a user may use an application running on the smart phone to cause the home automation bridge to enter an association mode. At 106, the user may actuate a button on the remote control to bring the remote control into the system (e.g., to associate the remote control with the home automation bridge). At 108, after the remote control is brought into the system, the remote control may wake up from a sleep mode periodically. For example, after the remote control is brought into the system, the remote control may wake up from a sleep mode on a periodic that is less than 8 seconds (e.g., about every 7.5 to 7.68 seconds) to poll the home automation bridge for a group number to use to communicate on the system. At 110, the user may use the application on the smart phone to identify the remote control device to be used in the system and create a relationship between the remote controls and a load control device. The home automation bridge chooses a group number for the selected remote control devices, at 112, upon receiving the identification of the remote control devices from the user selection on the application and sends the group number to the remote control device in response to the next polling request from the remote control device after the identification of the remote control device on the smart phone. The method may end at 114.

Since the remote control is typically a battery-powered device, the remote control may be configured to enter a sleep mode in which its internal RF transceiver is disabled (and thus cannot receive the RF signals) in order to reduce the energy consumption of the battery and increase the lifetime of the battery. Because the remote control device needs to receive the group number from the home automation bridge to communicate in the system, the remote control devices need to wake up periodically to determine if an RF signal is being transmitted by a control device in the system (e.g., the home automation bridge). For example, the remote control may wake up on a periodic that is less than 8 seconds (e.g., about every 7.5 to 7.68 seconds) to see if an RF signal is being transmitted. However, waking up at that rate may not provide an acceptable lifetime for the battery. For example, the life of the battery may be less than one year if the remote control wakes up on a periodic that is less than 8 seconds (e.g., about every 7.5 to 7.68 seconds) to poll for a group number. As the home automation bridge is waiting for the application on the smart phone to identify the remote control device before generating a group number for the remote control device, the remote control device has to continue to poll for the group number for periods of time that decrease the battery life of the remote control device. Additionally, when there are multiple remote control devices polling for the group number at such a frequent interval, the polling requests may cause interference with one another or other RF communications on the network, which may cause delays in network communications, responses to polling requests, and other network inefficiencies. Thus, there exists a need for a battery power efficient and network communication efficient method of using a programming device to associate a remote control with a load control device that communicates according to the Zigbee protocol.

SUMMARY

A load control system may be used to control the amount of power delivered to an electrical load, such as a lighting load. The load control system may include wireless control devices, such as control-source devices and control-target devices. The wireless control devices may be associated to enable identification of, and control based on, the digital messages. A control-source device may indirectly control the amount of power provided to an electrical load by transmitting digital messages to a control-target device. A control-target device may directly control the amount of power provided to the electrical load based on the digital messages received from a control-source device. For example, a control-source device, such as a battery-powered remote control device, may be used to send digital messages to a control-target device, such as a controllable light source, to control a lighting load.

The load control system may comprise a gateway device configured to enable communication with a network. The gateway device may be configured to communicate with a remote control device and/or a controllable light source, via RF signals. The gateway device may be configured to receive digital messages via the RF signals from the remote control device and/or the controllable light source. The gateway device may relay digital messages between the control devices of the load control system and/or the control devices and the network.

The load control system may comprise a programming device, such as a network device. The network device may be a smart phone (e.g., an iPhone® smart phone, an Android® smart phone, or a Blackberry® smart phone), a personal computer, a laptop, a wireless-capable media device (e.g., MP3 player, gaming device, or television), a tablet device (e.g., an iPad® hand-held computing device), a Wi-Fi or wireless-communication-capable television, or any other Internet-Protocol-enabled device. The remote control device may be associated with the load control device using the network device.

The gateway device may enter an association mode. For example, a user may use the network device to send a digital message to cause the gateway device to enter an association mode. The remote control device may be identified in the load control system, for example, by the user actuating a button on the remote control device to send a digital message from the remote control device to the gateway device. The digital message may be an association message, for example, that includes association information that may identify the remote control device to associate the remote control device with the gateway device. The gateway device may be associated with the remote control device by storing the association information of the remote control device.

The controllable light source may be identified in the load control system. For example, the controllable light source may be associated with the gateway device while the gateway device is in the association mode. The user may turn on the controllable light source, or press a button on the controllable light source, to send a digital message from the controllable light source to the gateway device. The digital message may be an association message, for example, that includes the association information to associate the controllable light source with the gateway device. The gateway device may define an association between the remote control device and the controllable light source after receiving the association information for each control device.

A group number, or other identifier of the remote control device, may be chosen for the remote control device. For example, a group number may be chosen for the remote control device in response to the actuation of the button on the remote control device to bring the remote control device into the load control system. The group number may be a random number generated as a network identifier and/or a group identifier of a group for one or more wireless control devices. The group number may be an identifier that corresponds to one or more control-source devices (e.g., a remote control device), and/or the group number may be an identifier that is associated with one or more control-target devices (e.g. a controllable light source). The group number may be an identifier that corresponds to multiple remote control devices that may similarly control the one or more control-target devices associated with the group number. The group number may be configured such that control-target devices, such as the controllable light source, may respond to digital messages that include the group number with which the control-target devices are associated The remote control device may request the group number. For example, the remote control device may request the group number from the gateway device. The remote control device may refrain from entering a sleep mode during the request from the remote control device for the group number. The remote control device may attempt to retrieve the group number based upon a predetermined period (e.g., on a period that is less than 8 seconds, such as about every 7.5 to 7.68 seconds) defined by the period for the sleep mode. The remote control device may determine a group number, and/or the remote control device may transmit a query message to the gateway device to determine if the group number is in use.

The remote control device may store the selected group number in memory. Upon the remote control device storing the selected group number, the remote control device may enter into a sleep mode. The sleep mode may be an initial sleep mode entered by the remote control device, and/or the sleep mode may be an extended sleep mode. Because the remote control may wake up at a less frequent rate during an extended sleep mode, the life expectancy of the battery of the remote control device may be extended. For example, the life of the battery of the remote control device may be approximately 7.5 years if the remote control device only wakes up once per hour.

DETAILED DESCRIPTION

A load control system may control the amount of power delivered to an electrical load, such as a lighting load. The load control system may include wireless control devices, such as control-source devices and control-target devices. The wireless control devices may be associated to enable identification of, and control based on, the digital messages. A control-source device may indirectly control the amount of power provided to an electrical load by transmitting digital messages to a control-target device. A control-target device may directly control the amount of power provided to the electrical load based on the digital messages received from a control-source device. The digital messages may include control instructions (e.g., load control instructions) or another indication (e.g., measurement) that causes the load control device to determine load control instructions for controlling an electrical load. For example, a control-source device, such as a battery-powered remote control device, may be used to send digital messages to a control-target device, such as a controllable light source, to control a lighting load.

Figure 1:
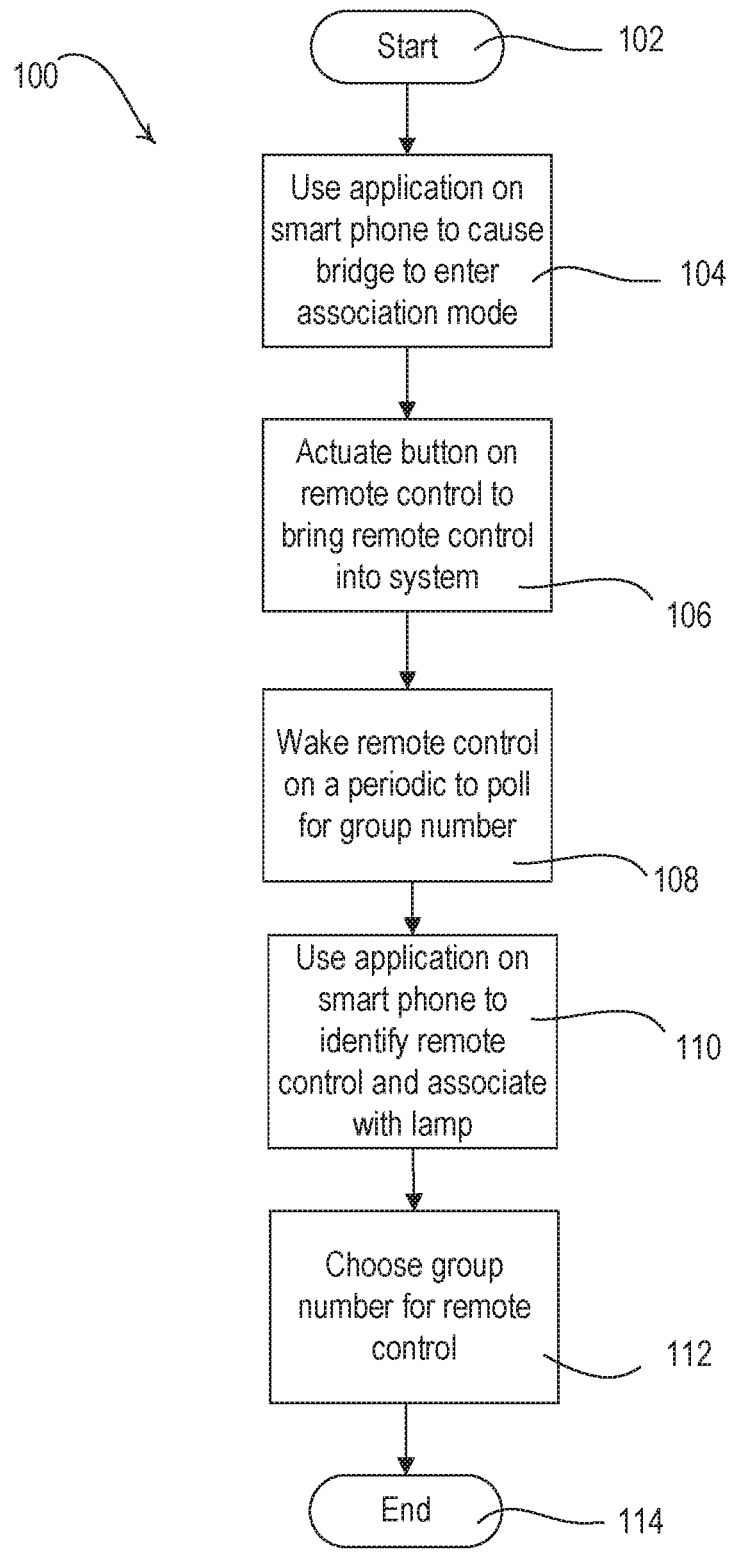
FIG. 1 is a flowchart of a prior art association procedure for associating a remote control with a load control device.
Figure 2:
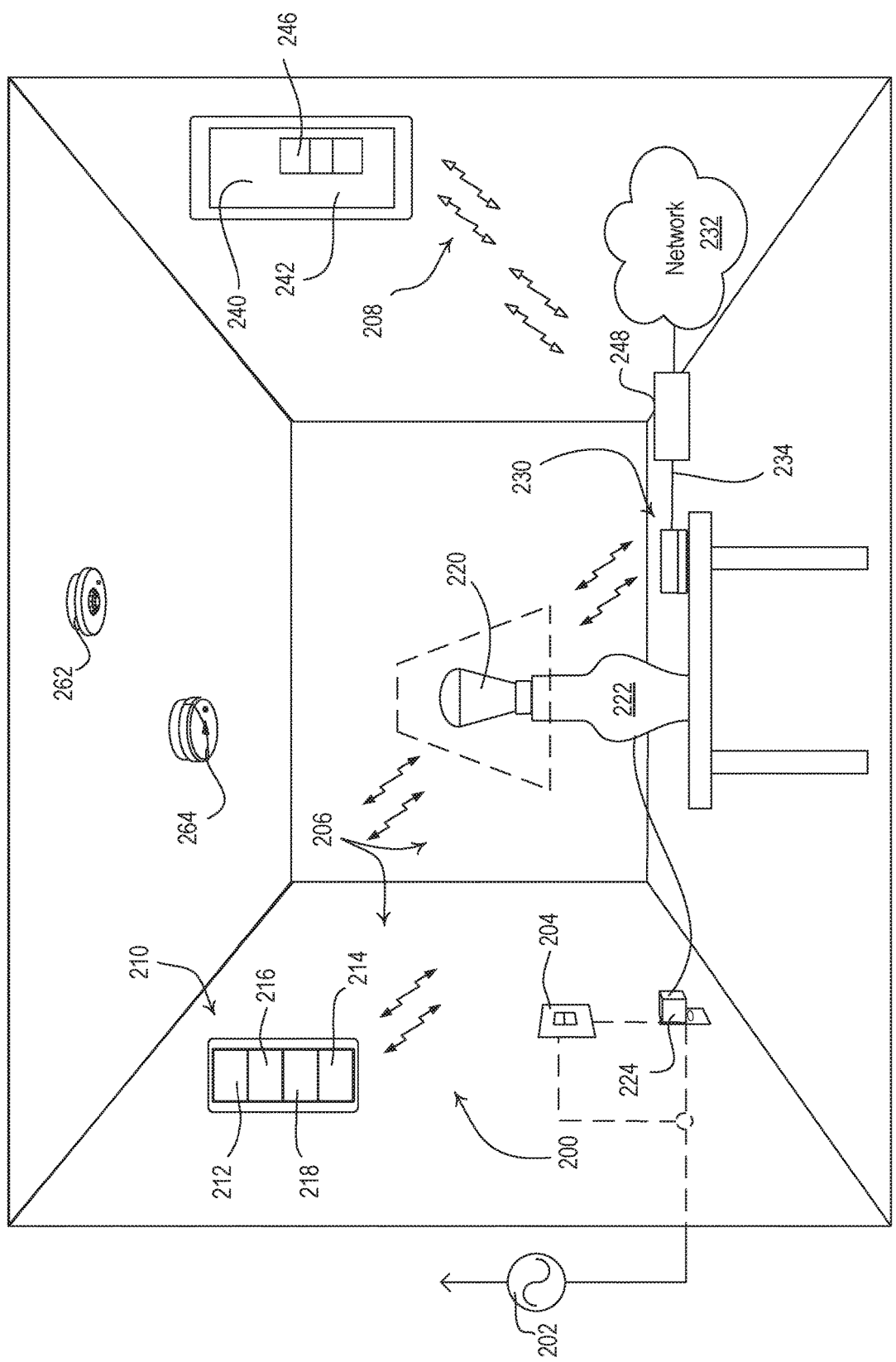
FIG. 2 is a diagram of an example load control system.

FIG. 2 is a diagram of an example load control system 200 having a control-source device and a control-target device. For example, the control-source device may be a battery-powered remote control device 210 and the control-target device may be a controllable light source 220. The controllable light source 220 may be installed in, for example, a table lamp 222, and may receive power from an alternating-current (AC) power source 202. For example the table lamp 222 may be plugged into an outlet via a plug-in AC power supply 224. In some installations, a standard, single pole single throw (SPST) maintained mechanical switch 204, such as a toggle switch or a light switch, may be coupled in series electrical connection between the AC power source 202 and the controllable light source 220. The switch 204 may be for disconnecting the controllable light source 220 from the AC power source 202 and thus turning off the controllable light source 220. The remote control device 210 may be configured to transmit digital message to the controllable light source 220 via wireless signals, e.g., radio-frequency (RF) signals 206. For example, the remote control device 210 may be configured to transmit digital message to the controllable light source 220 according to the Zigbee standard protocol. The remote control device 210 may be configured to transmit digital message to the controllable light source 220 according to the Zigbee standard protocol via wireless signals, e.g., radio-frequency (RF) signals 208.

The controllable light source 220 may comprise an integral lighting load (such as an incandescent lamp, a halogen lamp, a compact fluorescent lamp, a light-emitting diode (LED) light engine, or other suitable light source) and an integral load control circuit (such as a dimmer circuit, a ballast circuit, or a LED driver circuit) for controlling the intensity of the lighting load. The controllable light source 220 may be configured to turn the internal lighting load on and off and/or adjust the intensity of the lighting load in response to the RF signals 206 received from the remote control device 210. Examples of screw-in luminaires are described in greater detail in commonly-assigned U.S. Pat. No. 8,008,866, issued Aug. 30, 2011, entitled HYBRID LIGHT SOURCE; U.S. Patent Application Publication No. 2012/0286689, published Nov. 15, 2012, entitled DIMMABLE SCREW-IN COMPACT FLUORESCENT LAMP HAVING INTEGRAL ELECTRONIC BALLAST CIRCUIT; and U.S. patent application Ser. No. 13/829,834, filed Mar. 14, 2013, entitled CONTROLLABLE LIGHT SOURCE, the entire disclosures of which are hereby incorporated by reference.

The remote control device 210 may comprise a plurality of actuators, such as buttons 212-218. The actuators may include an on button 212, an off button 214, a raise button 216, and/or a lower button 218, as shown in FIG. 2. The remote control device 210 may be a handheld remote control. Alternatively, or additionally, the remote control device 210 may be mounted vertically to a wall or supported on a pedestal to be mounted on a tabletop. The remote control device 210 may comprise a microprocessor and an RF transceiver for transmitting and/or receiving the RF signals 206. The remote control device 210 may also comprise a battery (e.g., a CR2032 battery) for powering the microprocessor, the RF transceiver, and/or other circuitry of the remote control device. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Pat. No. 7,573,208, issued Aug. 11, 2009, entitled METHOD OF PROGRAMMING A LIGHTING PRESET FROM A RADIO-FREQUENCY REMOTE CONTROL, the entire disclosures of which are hereby incorporated by reference.

The remote control device 210 (e.g., the control-source device) may transmit the RF signals 206 to the controllable light source 220 (e.g., the control-target device) for controlling the intensity of the lighting load in response to actuations of the buttons 212-218. Digital messages transmitted by the remote control device 210 may include a command and/or association information. For example, digital messages transmitted by the remote control device 210 may include a unique identifier associated with the remote control device. As used herein, a control-source device may be a control device operable to transmit a digital message to a control-target device, and a control-target device may be a control device operable to receive a digital message from a control-source device. The remote control device 210 may transmit an association message in response to actuation of one or more of the buttons 212-218. The actuation of the same one or more of the buttons 212-218 may cause the remote control device 210 to transmit a control message (e.g., after association has been performed, after an actuation of the one or more buttons 212-218 for a different period of time, etc.). A single control device may be configured to operate as a control-source device and a control-target device. Examples of control-source and control-target devices are described in greater detail in commonly-assigned U.S. Patent Application Publication No. 2014/0265568, published Sep. 18, 2014, entitled COMMISSIONING LOAD CONTROL SYSTEMS, the entire disclosure of which is hereby incorporated by reference.

The load control system 200 may comprise other types of control-source devices, such as a remote occupancy or vacancy sensor 262 for detecting occupancy and/or vacancy conditions in the space in which the load control system is installed. The occupancy or vacancy sensors 262 may transmit digital messages to the controllable light source 220 via the RF signals 206 in response to detecting the occupancy or vacancy conditions. An occupancy sensor may transmit occupancy conditions and/or vacancy conditions. A vacancy sensor may transmit vacancy conditions. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The control-source devices of the load control system 200 may comprise a remote daylight sensor 264 for measuring a total light intensity in the space in which the load control system is installed. The daylight sensor 264 may transmit digital messages including the measured light intensity to the controllable light source 220 via the RF signals 206, such that the controllable light source 220 may be operable to control the intensity of the lighting load in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The load control system 200 may comprise a gateway device 230 (e.g., a bridge) configured to enable communication with a network 232, e.g., a wireless and/or wired local area network (LAN). The gateway device 230 may be connected to a router 248 via a wired digital communication link 234. The digital communication link 234 may be an Ethernet communication link, for example. The router 248 may allow for communication with the network 232, e.g., for access to the Internet. The gateway device 230 may be wirelessly connected to the network 232, e.g., using Wi-Fi technology, cellular technology, and/or other wireless communication technology.

The gateway device 230 may be configured to communicate with the remote control device 210 and/or the controllable light source 220 via the RF signals 206 (e.g., according to the Zigbee standard protocol). For example, the gateway device 230 may be configured to transmit a digital message to the controllable light source 220 via the RF signals 206 for controlling the controllable light source 220 in response to a digital message received from external devices via the network 232. For example, the external devices may include the remote control device 210, the occupancy sensor 262, the daylight sensor 264, devices from which digital messages are received via the network 232, and/or other devices external to the gateway device 230 from which digital messages may be received. The gateway device 230 may be configured to receive digital messages via the RF signals 206 from the remote control device 210 and/or the controllable light source 220. The gateway device 230 may be configured to transmit digital messages via the network 232 for providing data (e.g., status information) to external devices. The gateway device 230 may operate as a central controller for the load control system 200. The gateway device 230 may relay digital messages between the control devices of the load control system and/or the control devices and the network 232.

The load control system 200 may comprise a network device 240, such as a smart phone (e.g., an iPhone® smart phone, an Android® smart phone, or a Blackberry® smart phone), a personal computer, a laptop, a wireless-capable media device (e.g., MP3 player, gaming device, or television), a tablet device (e.g., an iPad® hand-held computing device), a Wi-Fi or wireless-communication-capable television, or any other Internet-Protocol-enabled device. The network device 240 may be operable to transmit digital messages in one or more Internet Protocol packets to the gateway device 230 via RF signals 208 either directly or via the network 232. For example, the network device 240 may transmit the RF signals 208 to the gateway device 230 and/or the network 232 via a Wi-Fi communication link, a Wi-MAX communications link, a Bluetooth® communications link, a near field communication (NFC) link, a cellular communications link, a television white space (TVWS) communication link, or any combination thereof. The RF signals 208 may be transmitted using a different protocol and/or wireless band than the RF signals 206. For example, the RF signals 208 may be transmitted using WI-FI® or cellular signals and the RF signals 206 may be transmitted using another RF communication protocol, such as BLUETOOTH®, Zigbee, or a proprietary communication protocol. The RF communication signals 208 may be transmitted using the same protocol and/or wireless band than the RF communication signals 206. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The network device 240 may have a visual display 242, which may comprise a touch screen having, for example, a capacitive touch pad displaced overtop the visual display. The network device 240 may comprise one or more buttons 246. For example, the visual display may display soft buttons that may be actuated by a user. In addition, or alternatively, the network device 240 may comprise a plurality of hard buttons, e.g., physical buttons, in addition to the visual display 242. The network device 240 may download a product control application for allowing a user of the network device 240 to setup and control the lighting control system 200. In response to actuations of the displayed soft buttons and/or hard buttons, the network device 240 may transmit digital messages to the gateway device 230 through the wireless communications described herein. The network device 240 may transmit digital messages to the gateway device 230 via the RF signals 208 for controlling the controllable light source 220. The gateway device 230 may be configured to transmit digital messages in the RF signals 208 to the network device 240 in response to digital messages received from the remote control device 210 and/or the controllable light source 220 for displaying data (e.g., status information) on the visual display 242 of the network device 240.

The load control system 200 may be programmed and/or configured using the network device 240. During the configuration procedure of the load control system 200, control-target devices may be associated with control-source devices. For example, the controllable light source 220 may be associated with the remote control device 210, such that the controllable light source 220 may then be responsive to digital messages transmitted by the remote control device 210. An example of a configuration procedure of a load control system is described in greater detail in previously-referenced U.S. Patent Application Publication No. 2014/0265568.

Figure 3:
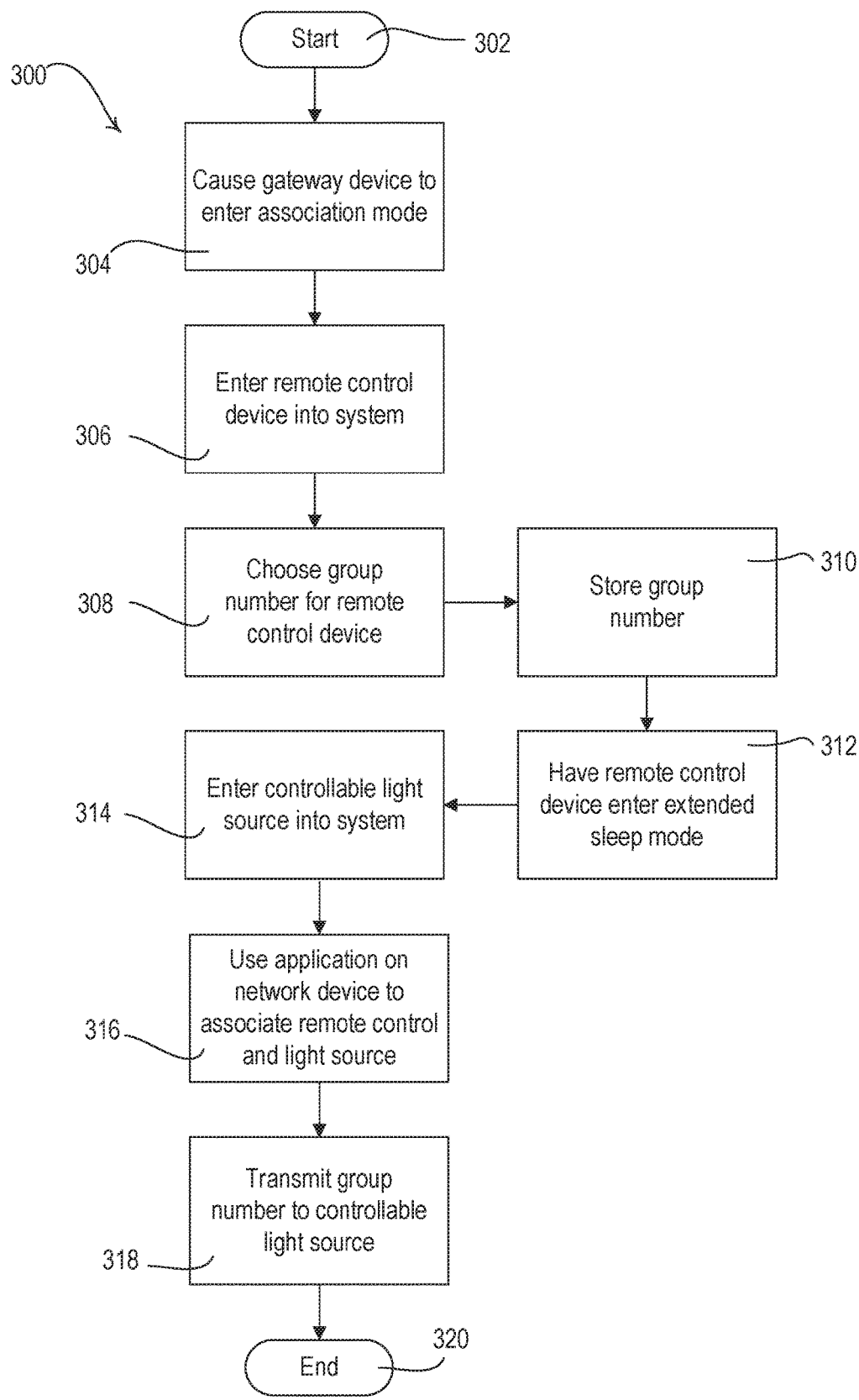
FIGS. 3-5 show flowcharts of example association procedures for associating wireless control devices using a programming device.

FIG. 3 is a flowchart of an example association procedure 300 for associating wireless control devices. For example, referring to FIG. 3, the example association procedure 300 may be used to associate the remote control device 210 with a load control device, such as the controllable light source 220, using a programming device, such as the network device 240. The association procedure 300 may begin at 302. At 304, the gateway device 230 may enter an association mode. For example, at 304, a user may use the product control application running on the network device 240 to send a digital message to cause the gateway device 230 to enter an association mode by actuating a button on the network device 240. At 306, the remote control device 210 may be identified in the load control system. The remote control device 210 may store association information. For example, the remote control device 210 may store association information so that the remote control device 210 can send digital messages to, and/or receive digital messages from, the network device 240 and/or the gateway device 230. The association information may include a unique identifier and/or a device type for the network device 240 and/or the gateway device 230. The user may actuate a button on the remote control device 210 to send a digital message from the remote control device 210 to the gateway device 230. The digital message may be sent from the remote control device 210 and may include association information that identifies the remote control device 210. The association information may include a unique identifier, such as a serial number or other identifier, and/or a device type identifier that indicates the device as a remote control device. The digital message may be an association message, for example, that includes the association information (e.g., a serial number, device type, etc.) that uniquely identifies the remote control device to associate the remote control device 210 with the gateway device 230. The gateway device 230 may be associated with the remote control device 210 by storing the association information of the remote control device 210 (e.g., in a dataset), such that the gateway device 230 may identify and interpret digital messages from the remote control device 210 for performing programming and/or control in the load control system 200.

At 308, a group number, or other identifier of the remote control device 210, may be chosen for the remote control device 210. For example, in response to the actuation of the button on the remote control device 210 to bring the remote control device 210 into the load control system 200, at 306, a group number may be chosen (e.g., automatically chosen) for the remote control device 210, at 308. The group number may be a random number generated as a network identifier and/or a group identifier of a group for one or more wireless control devices. The group number may be an identifier that corresponds to a single control-source device, such as the remote control device 210, and may be associated with one or more control-target devices, such as one or more controllable light sources. The group number may be an identifier that corresponds to multiple remote control devices that may similarly control the one or more control-target devices associated with the group number. The group number may be configured such that control-target devices, such as the controllable light source 220, may respond to digital messages (e.g., comprising load control instructions) including the group number with which the control-target devices are associated.

The remote control device 210 may request the group number. For example, the remote control device 210 may request the group number from the gateway device 230. The remote control device 210 may refrain from entering a sleep mode during the request from the remote control device 210 request for the group number. The remote control device 210 may attempt to retrieve the group number based upon a predetermined period (e.g., on a period that is less than 8 seconds, such as about every 7.5 to 7.68 seconds) defined by the period for the sleep mode. The remote control device 210 may determine (e.g., randomly select) a group number and the remote control device 210 may transmit a query message to the gateway device 230 to determine if the randomly-selected group number is in use. If the randomly-selected group number is in use, the remote control device 210 may determine another group number (e.g., random group number) and may repeat the process until an unused group number is determined. The remote control device 210 may store the selected group number (e.g., the selected group number that is unused) in memory, at 310.

Upon the remote control device 210 storing the selected group number, the remote control device 210 may enter into a sleep mode, at 312. The sleep mode, at 314, may be the initial sleep mode entered by the remote control device 210 during the association procedure 300. The remote control device 210 may enter into an extended (e.g., one hour, twenty-four hours, etc.) sleep mode at 314.

The extended sleep mode may be longer than the polling sleep mode for which the remote control device 210 may be programmed to awaken to poll for a group number (e.g., according to the Zigbee standard). The remote control device 210 may be configured to remain in a sleep mode unless a user actuates a button on the remote control device 210. The gateway device 230 may store the selected group number for the remote control device 210 in memory, at 310. The gateway device 230 may be configured to transmit the selected group number to the network device 240, which may store the unique identifier in memory, at 310.

In response to the actuation of the button on the remote control device 210 to bring the remote control device 210 into the load control system 200, at 306, the gateway device 230 may choose an unused group number and may transmit the selected group number to the remote control device 210, at 308. The remote control device 210 may store the received group number in memory, at 310. Upon the remote control device 210 storing the selected group number, the remote control device 210 may enter into a sleep mode, at 312. The remote control device 210 may enter into an extended (e.g., one hour, twenty-four hours, etc.) sleep mode. The remote control device 210 may be configured to remain in a sleep mode until a user actuates a button on the remote control device 210 (e.g., a user actuation to transmit control instructions for controlling an electrical load or otherwise configure the load control system). In response to the actuation of the button on the remote control device 210 to bring the remote control device 210 into the load control system 200, at 306, the remote control device 210 may transmit a request for a group number to the gateway device 230, at 308, which may be stored at 310.

At 314, the controllable light source 220 may be identified in the load control system. For example, the controllable light source 220 may be associated with the gateway device 230 at 314 while the gateway device 230 is in the association mode. The controllable light source 220 may be associated with the gateway device 230 at 314, if the gateway device 230 enters the association mode within a predetermined amount of time within the controllable light source 220 entering the association mode. The controllable light source 220 may store information (e.g., association information, network information, etc.) so the controllable light source 220 can send digital messages to, and/or receive digital messages from, the network. For example, the user may turn on the controllable light source 220, or press a button on the controllable light source 220 or a button on the load control device thereof, to send a digital message from the controllable light source 220 to the gateway device 230. The digital message may include identification information that identifies the controllable light source 220. The identification information may include a unique identifier, such as a serial number or other identifier, and/or a device type identifier that indicates the device as a controllable light source. The digital message may be an association message, for example, that includes the identification information to associate the controllable light source 220 with the gateway device 230. The gateway device 230 may be associated with the controllable light source 220 by storing the identification information of the controllable light source 220, such that the gateway device 230 may identify and interpret digital messages from the remote control device 220 for performing programming and/or control in the load control system 200. Multiple remote control devices, or other control-source devices, and controllable light sources, or other control-target devices, may be associated with the gateway device 230 as described herein. The gateway device 230 may define an association between the remote control device 210 and the controllable light source 220 after receiving the association information for each control device. For example, the gateway device 230 may store the association information for each device in a dataset within which the association for each device corresponds to one another.

In response to the actuation of the button on the remote control device 210 to bring the remote control device 210 into the load control system 200, at 306, the remote control device 210 may wait for a predetermined amount of time (e.g., may wait for a time that is less than 8 seconds, such as about every 7.5 to 7.68 seconds) for the gateway device 230 to choose an unused group number and transmit the selected group number to the remote control device 210. If the remote control device 210 does not receive the group number from the gateway device 230 within the predetermined amount of time, the remote control device 210 may select (e.g., randomly select) a group number and may transmit a query message to the gateway device 230. The query message may be used to determine if the randomly-selected group number is already in use. The remote control device 210 may continue to submit query messages until an unused group number is determined, as described herein.

After the group number is selected, at 308, and stored, at 310, the gateway device 230 may be capable of associating the remote control device 210 with the controllable light source 220 at a point in time in the future without the need to communicate with the remote control device 210. The remote control device 210 may enter into a sleep mode, at 312. For example, the remote control device 210 may enter into an extended sleep mode (e.g., one hour, twenty-four hours, etc.). The user may use the product control application running on the network device 240 to associate the remote control device 210 with the controllable light source 220.

The remote control device 210 may be associated with the controllable light source 220 by storing association information on the remote control device 210 and the controllable light source 220. For example, the user may actuate a button on the remote control device 210 to send a digital message from the remote control device 210 to the controllable light source 220. The remote control device 210 may send the digital message directly to the controllable light source 220, and/or the remote control device 210 may send the digital message to the controllable light source via the gateway device 230. The digital message may include identification information that identifies the remote control device 210 and/or the controllable light source 220. The identification information may include a unique identifier, such as a serial number or other identifier, and/or a device type identifier that indicates the device as a remote control device and/or a controllable light source. The digital message may be an association message, for example, that includes the identification information to associate the remote control device 210 with the controllable light source 220. The controllable light source 220 may be associated with the remote control device 210 by storing the identification information of the remote control device 210, such that the controllable light source 220 may identify and interpret digital messages from the remote control device 210 for performing programming and/or control in the load control system 200.

The network device 240 may transmit association information to the gateway device 230 (e.g., after selection by a user on the network device 240). The association information may include the identification information being sent in an association message. At 316, the gateway device 230 may look up the group number of the remote control device 210 corresponding to the received association information. The gateway device 230 may transmit the group number of the remote control device 210 (as chosen and selected at 310 and 312) to the controllable light source 220, which may store the received group number in memory. The controllable light source 220 may be responsive to received RF signals that include the stored group number (e.g., as transmitted by the remote control device 210). The association procedure 300 may end at 318.

Because the remote control device 210 may store the group number (at 312 of the association procedure 300) before the association between the remote control device 210 and the controllable light source 220 is completed using the network device 240, the remote control device 210 may be configured to enter an extended sleep mode for an extended period of time (e.g., one hour, twenty-four hours). The extended sleep mode may be longer than the polling sleep mode for which the remote control device 210 may be programmed to awaken to poll for a group number (e.g., according to the Zigbee standard). The extended sleep mode may be ended after actuation of a button on the remote control device 210. For example, the remote control device 210 may be awakened to receive digital messages via the RF signals 206 in response to an actuation of one of the buttons 212-218 of the remote control.

The implementation of the association procedure 300 may cause the remote control device 210 to wake up periodically at a less frequent rate than the remote control device 210 would wake up during the polling sleep mode. For example, the remote control device 210 may enter an extended sleep mode, which may cause the remote control device 210 to wake up once every hour. The life expectancy of the battery of the remote control device 210 may be extended if it wakes up at a less frequent rate. For example, the life of the battery of the remote control device 210 may be approximately 7.5 years if the remote control device only wakes up once per hour.

Figure 4:
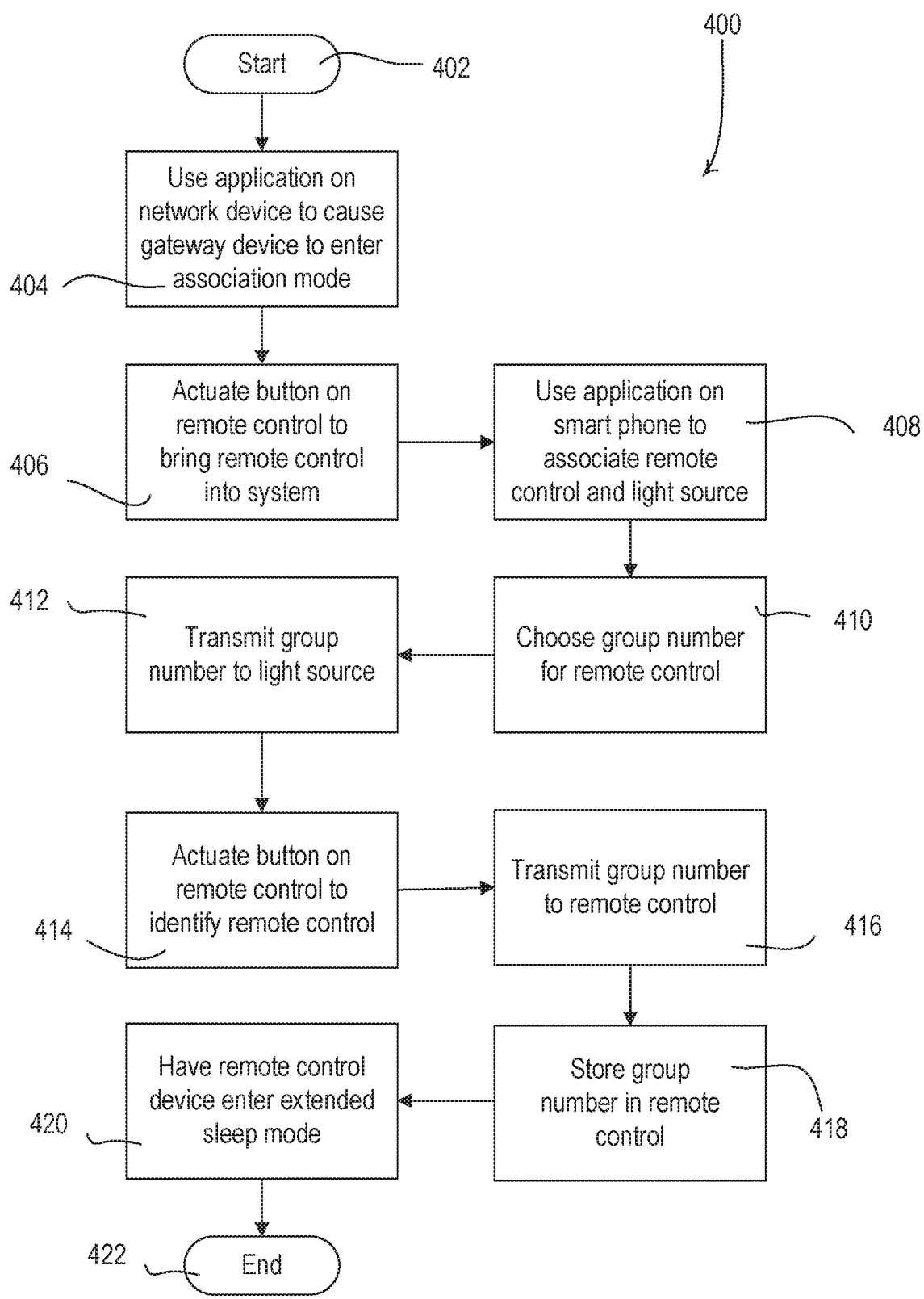

FIG. 4 is a flowchart of another example association procedure 400 for associating wireless control devices, such as the remote control device 210 with a load control device, such as the controllable light source 220, using a programming device (e.g., the network device 240). The association procedure 400 may begin at 402. At 404, the gateway device 230 may enter an association mode. For example, the user may use the product control application running on the network device 240 to send a digital message to cause the gateway device 230 to enter an association mode. The user may actuate a button on the remote control device 210 to bring the remote control device 210 into the system, at 406 (e.g., to associate the remote control device with the gateway device 230). One or more controllable light sources, such as the controllable light source 220, may have already been entered into the system, or may be similarly entered into the system as described herein.

At 408, the remote control device 210 may be associated with the controllable light source 220. For example, the user may use the product control application running on the network device 240 to associate the remote control device 210 with the controllable light source 220. The network device 240 may receive digital messages from the gateway device, or directly from the control devices, that include the association information (e.g., unique identifiers, device type, etc.) for the control devices. For example, the digital messages may include the association information for the remote control device 210, the controllable light source 220, other remote control devices, and/or other controllable light sources. The association information (e.g., unique identifiers, device type, etc.) for the control devices may be displayed on a user interface of the product control application. The user may define the association between the remote control device 210 and the controllable light source 220 by choosing the controllable light source 220 and the remote control device 210 on a user interface for being associated at 408. In another example, the user may define the association between the remote control device 210 and the controllable light source 220 by choosing the controllable light source 220 on a user interface of the product control application for being associated with the remote control device 210, which may be predefined. The network device 240 may store the defined association between the remote control device 210 and the controllable light source 220 as a dataset in memory, which may include a direct correspondence between the association information of the remote control device 210 and the controllable light source 220. Though a single remote control device 210 and a single controllable light source 220 are defined in the association information, additional remote control devices and/or controllable light sources may be defined as being associated using the product control application running on the network device 240.

The network device 240 may transmit the association information including the defined association between the remote control device 210 and the controllable light source 220 to the gateway device 230 in response to a user actuation on the product control application. The gateway device 230 may choose an unused group number for the remote control device 210, at 410, and may transmit the group number of the remote control device 210 to the controllable light source 220, at 412. The gateway device 230 may choose the unused group number for the remote control device, at 410, in response to receipt of the association information including the defined association between the remote control device 210 and the controllable light source 220.

At 414, the user may actuate a button on the remote control device 210 to identify the remote control device associated with the controllable light source 220. For example, the product control application may display a message on the visual display 242 of the network device 240 prompting the user to actuate the button on the remote control device 210 to identify the remote control device 210, at 414. In response to the actuation of the button on the remote control device 210, at 414, the gateway device 230 may transmit the selected group number to the identified remote control device 210, at 416. The remote control device may store the received group number in memory, at 418.

Upon the remote control device 210 storing the selected group number, the remote control device 210 may enter into a sleep mode, at 420. The sleep mode, at 420, may be the initial sleep mode entered by the remote control device 210 during the association procedure 400. The remote control device 210 may enter into an extended sleep mode (e.g., one hour, twenty-four hours, etc.) at 420, for example. The remote control device 210 may be configured to remain in a sleep mode until a user actuates a button on the remote control device 210 (e.g., a user actuation to transmit control instructions for controlling an electrical load or otherwise configure the load control system). The association procedure 400 may end at 422.

Because the group number may be transmitted to the remote control device 210 in response to an actuation of the button on the remote control device, the remote control device may remain in the sleep mode for longer periods of time than the polling sleep mode. Accordingly, when using the association procedure 400 shown in FIG. 4, the remote control device 210 may be configured to be in the sleep mode for longer periods of time than other remote control devices that implement the polling sleep mode to poll for the group number.

Figure 5:
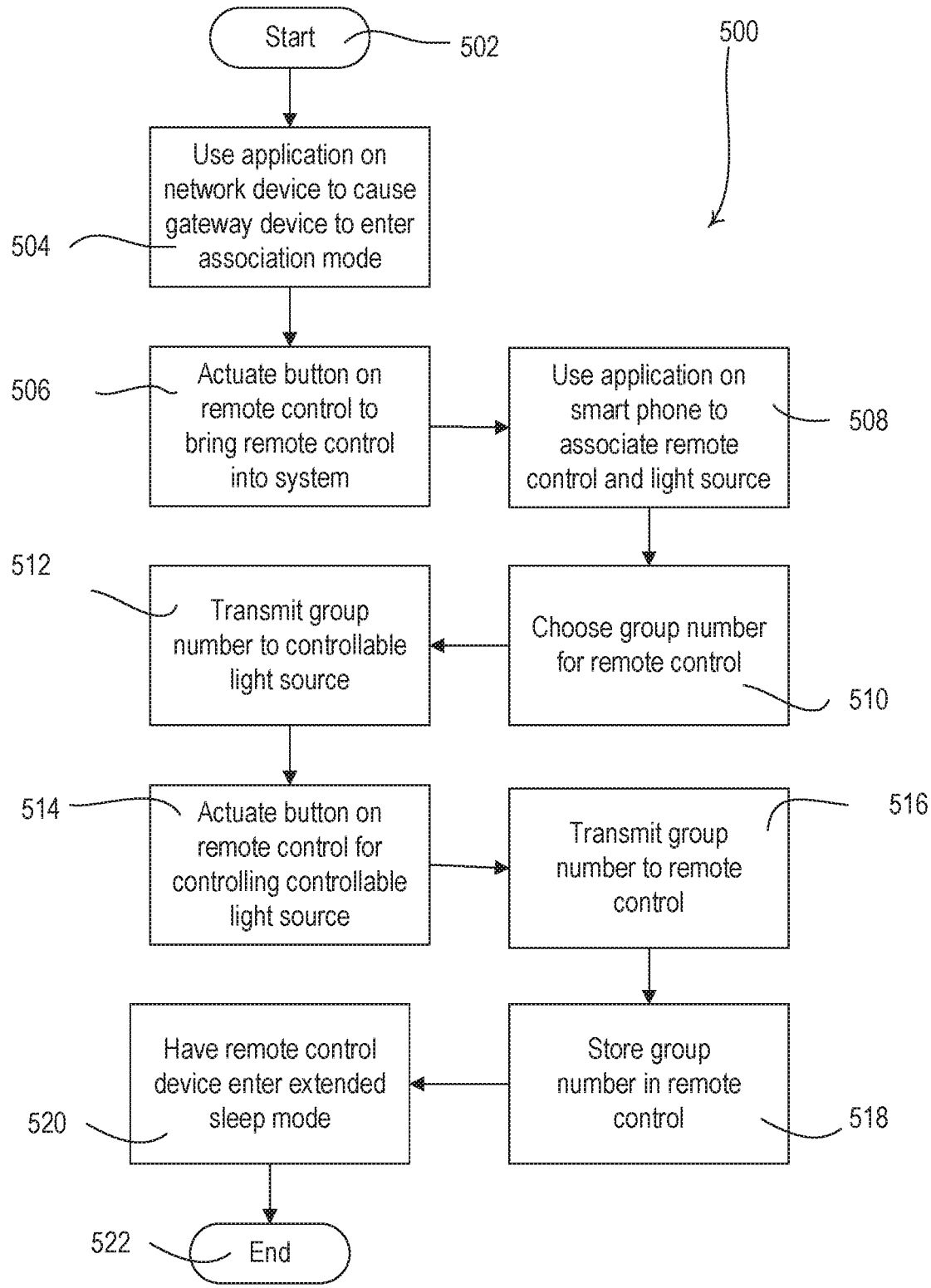

FIG. 5 is a simplified flowchart of another example association procedure 500 for associating wireless control devices (e.g., the remote control device 210 and a load control device, such as the controllable light source 220) using a programming device (e.g., the network device 240). The association procedure 500 may begin at 502. At 504, the gateway device 230 may enter an association mode. For example, user may use the product control application running on the network device 240 to send a digital message to cause the gateway device 230 to enter an association mode. A button on the remote control device 210 may be actuated to bring the remote control device 210 into the system at 506 (e.g., to associate the remote control device with the gateway device 230). One or more controllable light sources, such as the controllable light source 220, may have already been entered into the system, or may be similarly entered into the system as described herein.

At 508, the remote control device 210 may be associated with the controllable light source 220. For example, the user may use the product control application running on the network device 240 to associate the remote control device 210 with the controllable light source 220. The network device 240 may receive digital messages from the gateway device, or directly from the control devices, that include the association information (e.g., unique identifiers, device type, etc.) for the control devices. For example, the digital messages may include the association information for the remote control device 210, the controllable light source 220, other remote control devices, and/or other controllable light sources. The association information (e.g., unique identifiers, device type, etc.) for the control devices may be displayed on a user interface of the product control application. The network device 240 may define the association between the remote control device 210 and the controllable light source 220 by receiving user selections of the controllable light source 220 and the remote control device 210 on a user interface for being associated at 408. In another example, the network device 240 may define the association between the remote control device 210 and the controllable light source 220 by receiving user selections of the controllable light source 220 on a user interface of the product control application for being associated with the remote control device 210, which may be predefined. The network device 240 may store the defined association between the remote control device 210 and the controllable light source 220 as a dataset in memory, which may include a direct correspondence between the association information of the remote control device 210 and the controllable light source 220. Though a single remote control device 210 and a single controllable light source 220 are defined in the association information, additional remote control devices and/or controllable light sources may be defined as being associated using the product control application running on the network device 240.

The network device 240 may transmit the association information including the defined association between the remote control device 210 and the controllable light source 220 to the gateway device 230 in response to a user actuation on the product control application. The gateway device 230 may choose an unused group number for the remote control device 210, at 510. The unused group number may be chosen in response to the association information defining the association between the remote control device 210 and the controllable light source 220. The gateway device 230 may transmit the group number of the remote control device 210 to the controllable light source 220, at 512.

The association procedure 500 may halt until the user actuates a button on the remote control device 210, at 514. For example, the user may actuate the button on the remote control device 210 to control the controllable light source 220 during a lighting control operation of the load control system 200. The lighting control operation may be implemented by sending lighting control instructions from the remote control device 210 to the controllable light source 220. The lighting control instructions may include a command for turning on the controllable light source 220, turning off the controllable light source 220, increasing the dimming level of the controllable light source 220, decreasing the dimming level of the controllable light source 220, and/or setting the controllable light source 220 to a preset dimming level. The digital message including the lighting control instructions may include the unique identifier of the remote control device 210. In response to the actuation of the button on the remote control device 210, at 514, the gateway device 230 may transmit the selected group number to the remote control device, at 516. The gateway device 230 may transmit a digital message to the controllable light source 220 for controlling the controllable light source, at 516, according to the lighting control instructions. The remote control device may store the received group number in memory at 518.

Upon the remote control device 210 storing the selected group number, the remote control device 210 may enter into a sleep mode, at 520. The sleep mode, at 520, may be the initial sleep mode entered by the remote control device 210 during the association procedure 500. The remote control device 210 may enter into an extended sleep mode (e.g., one hour, twenty-four hours, etc.) at 520. The remote control device 210 may be configured to remain in a sleep mode until a user actuates a button on the remote control device 210. The association procedure 500 may end at 522. The remote control device 210 may be configured to transmit digital messages to which the controllable light source 220 is responsive (e.g., RF signals that include that group number).

Since the group number is transmitted to the remote control device 210 in response to an actuation of the button on the remote control device 210 to control the controllable light source 220, the remote control device 210 may remain in the sleep mode until the button is pressed during a lighting control operation. Accordingly, when using the association procedure 500 shown in FIG. 5, the remote control device 210 may be configured to be in the sleep mode for longer periods of time than a remote control device that implements the polling sleep mode.

Figure 6:
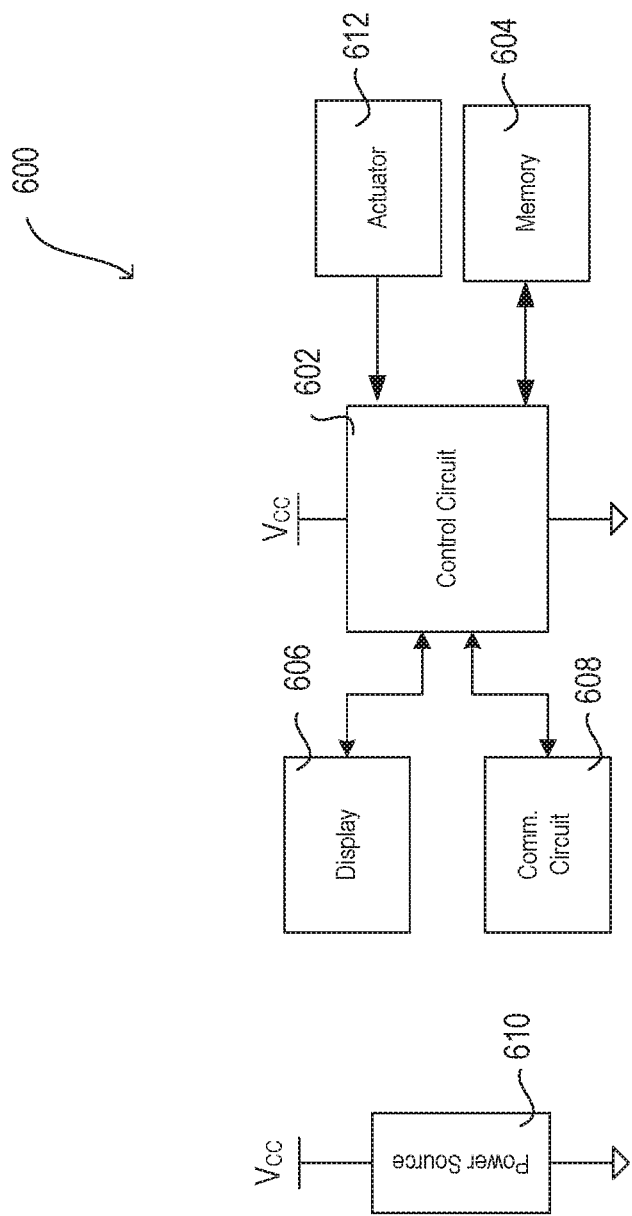
FIG. 6 is a block diagram of an example programming device.

FIG. 6 is a block diagram illustrating an example programming device 600 as described herein. The programming device 600 may be a network device (such as network device 240, for example). The programming device 600 may include a control circuit 602 for controlling the functionality of the programming device 600. The control circuit 602 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 602 may perform signal coding, data processing, display processing, power control, input/output processing, and/or any other functionality that enables the programming device 600 to perform as described herein. The control circuit 602 may store information in and/or retrieve information from the memory 604. The memory 604 may include a non-removable memory and/or a removable memory. The non-removable memory may include random-access memory (RAM), read-only memory (ROM), a hard disk, and/or any other type of non-removable memory storage. The removable memory may include a subscriber identity module (SIM) card, a memory stick, a memory card, and/or any other type of removable memory.

The programming device 600 may include a communications circuit 608 for transmitting and/or receiving information. The communications circuit 608 may perform wireless and/or wired communications. The communications circuit 608 may include an RF transceiver or other circuit capable of performing wireless communications. Communications circuit 608 may be in communication with control circuit 602 for transmitting and/or receiving information.

The control circuit 602 may be in communication with a display 606 for providing information to a user. The processor 602 and/or the display 606 may generate GUIs for being displayed on the programming device 600. The display 606 and the control circuit 602 may be in two-way communication, as the display 606 may include a touch screen module capable of receiving information (e.g., in response to actuations) from a user and providing such information to the control circuit 602. The programming device may include an actuator 612 (e.g., one or more buttons) that may be actuated by a user to communicate user selections to the control circuit 602.

Each of the modules within the programming device 600 may be powered by a power source 610. The power source 610 may include an AC power supply or a DC power supply, for example. The power source 610 may generate a supply voltage Vcc for powering the modules within the programming device 600.

Figure 7:
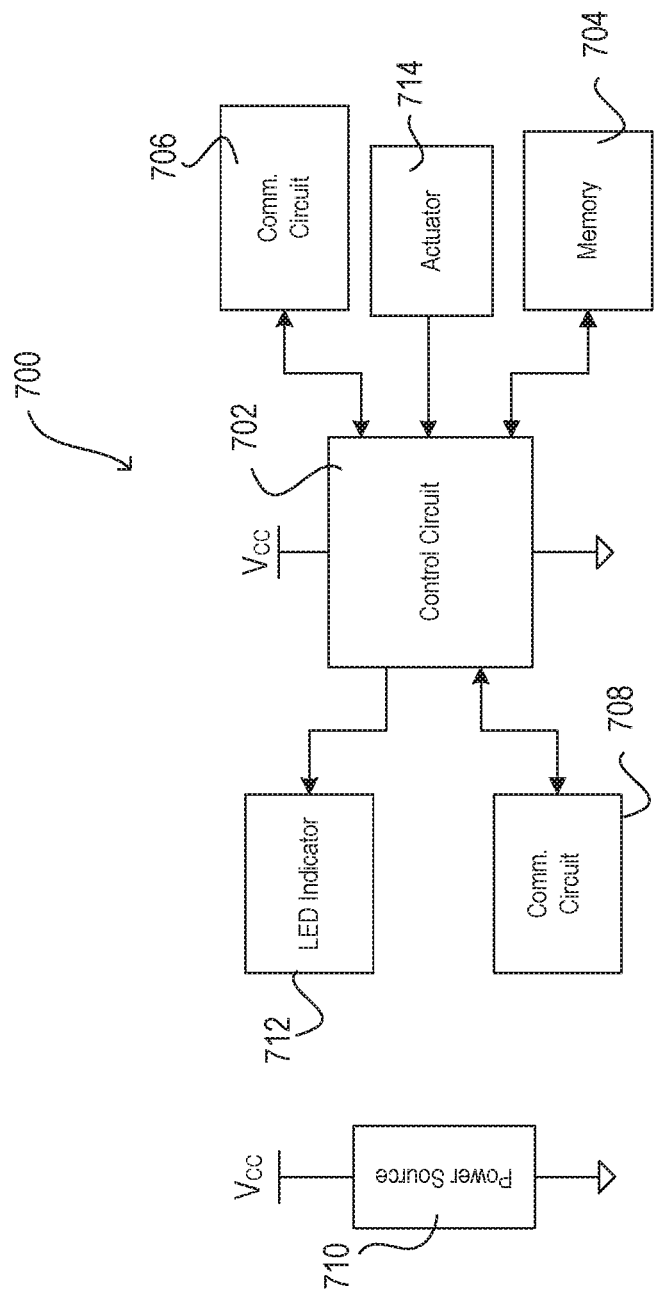
FIG. 7 is a block diagram of an example gateway device.

FIG. 7 is a block diagram illustrating an example gateway device 700 (such as gateway device 230, described herein). The gateway device 700 may include a control circuit 702 for controlling the functionality of the gateway device 700.

The control circuit 702 may include one or more general purpose processors, special purpose processors, conventional processors, digital signal processors (DSPs), microprocessors, integrated circuits, a programmable logic device (PLD), application specific integrated circuits (ASICs), and/ or the like. The control circuit 702 may perform signal coding, data processing, power control, input/output processing, and/or any other functionality that enables the gateway device 700 to perform as described herein. The control circuit 702 may store information in and/or retrieve information from the memory 704. The memory 704 may include a non-removable memory and/or a removable memory. The non-removable memory may include random-access memory (RAM), read-only memory (ROM), a hard disk, and/or any other type of non-removable memory storage. The removable memory may include a subscriber identity module (SIM) card, a memory stick, a memory card, and/or any other type of removable memory.

The gateway device 700 may include a communications circuit 706 for transmitting and/or receiving information. The communications circuit 706 may perform wireless and/or wired communications. The gateway device 700 may also, or alternatively, include a communications circuit 708 for transmitting and/or receiving information. The communications circuit 706 may perform wireless and/or wired communications. Communications circuits 706 and 708 may be in communication with control circuit 702. The communications circuits 706 and 708 may include RF transceivers or other communications modules capable of performing wireless communications. The communications circuit 706 and communications circuit 708 may be capable of performing communications via the same communication channels or different communication channels. For example, the communications circuit 706 may be capable of communicating (e.g., with a programming device, over a network, etc.) via a wireless communication channel (e.g., BLUETOOTH®, near field communication (NFC), WIFI®, WI-MAX®, cellular, etc.) and the communications circuit 708 may be capable of communicating (e.g., with control devices and/or other devices in the load control system) via another wireless communication channel (e.g., WI-FI® or a proprietary communication channel, such as CLEAR CONNECT™).

The control circuit 702 may be in communication with an LED indicator 712 for providing indications to a user. The control circuit 702 may be in communication with an actuator 714 (e.g., one or more buttons) that may be actuated by a user to communicate user selections to the control circuit 702. For example, the actuator 714 may be actuated to put the control circuit 702 in an association mode and/or communicate association messages from the gateway device 700.

Each of the modules within the gateway device 700 may be powered by a power source 710. The power source 710 may include an AC power supply or DC power supply, for example. The power source 710 may generate a supply voltage Vcc for powering the modules within the gateway device 700.

Figure 8:
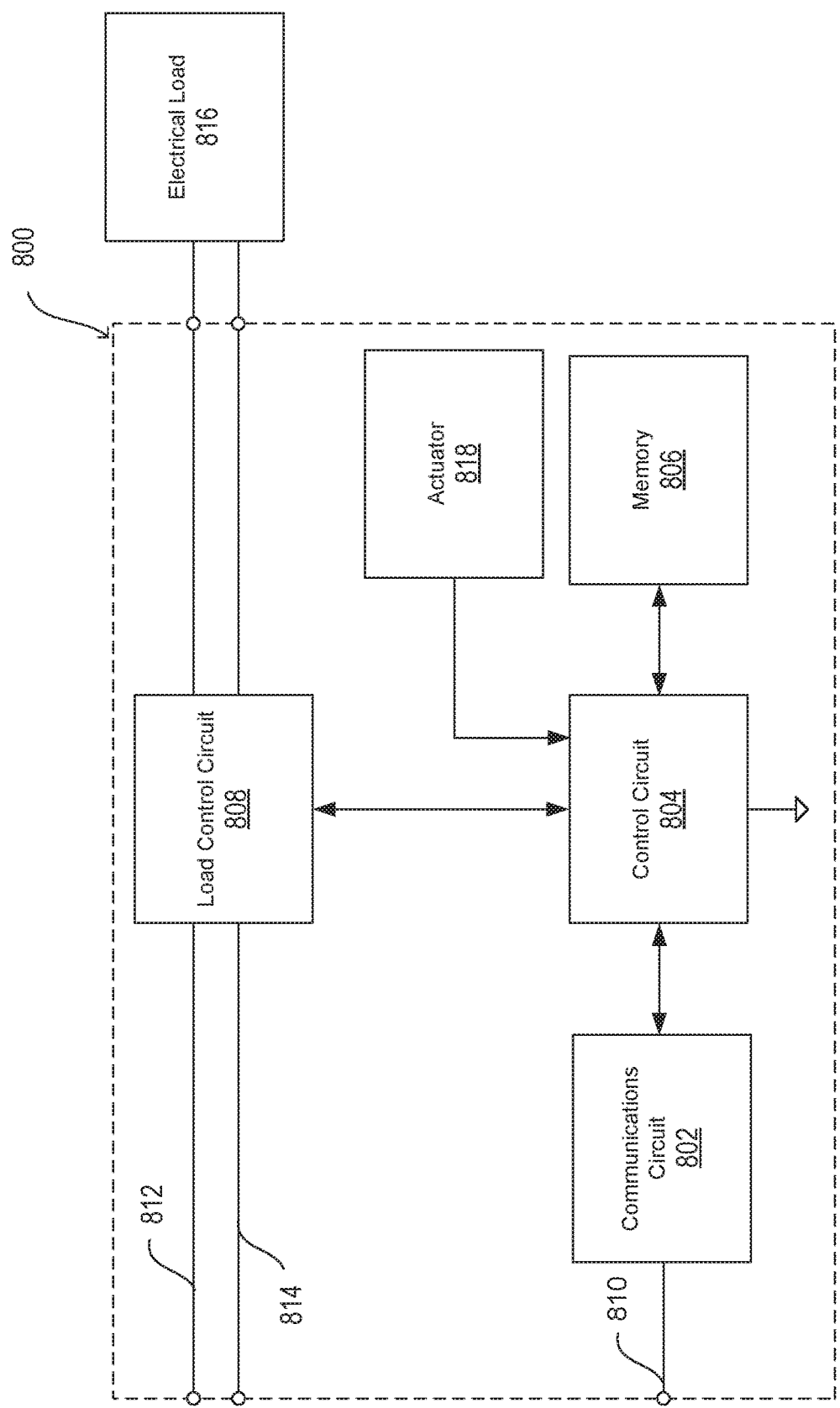
FIG. 8 is a block diagram of an example control-target device.

FIG. 8 is a block diagram illustrating an example control-target device, e.g., a load control device 800, as described herein. The load control device 800 may be controllable light source or another load control device. The load control device 800 may include a communications circuit 802. The communications circuit 802 may include a receiver, an RF transceiver, or other communications module capable of performing wired and/or wireless communications via communications link 810. The communications circuit 802 may be in communication with control circuit 804. The control circuit 804 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 804 may perform signal coding, data processing, power control, input/output processing, and/or any other functionality that enables the load control device 800 to perform as described herein.

The control circuit 804 may store information in and/or retrieve information from the memory 806. For example, the memory 806 may maintain a registry of associated control devices and/or control configuration instructions. The memory 806 may include a non-removable memory and/or a removable memory. The load control circuit 808 may receive instructions from the control circuit 804 and may control the electrical load 816 based on the received instructions. The load control circuit 808 may send status feedback to the control circuit 804 regarding the status of the electrical load 816. The load control circuit 808 may receive power via the hot connection 812 and the neutral connection 814 and may provide an amount of power to the electrical load 816. The electrical load 816 may include any type of electrical load.

The control circuit 804 may be in communication with an actuator 818 (e.g., one or more buttons) that may be actuated by a user to communicate user selections to the control circuit 804. For example, the actuator 818 may be actuated to put the control circuit 804 in an association mode and/or communicate association messages from the load control device 800.

Figure 9:
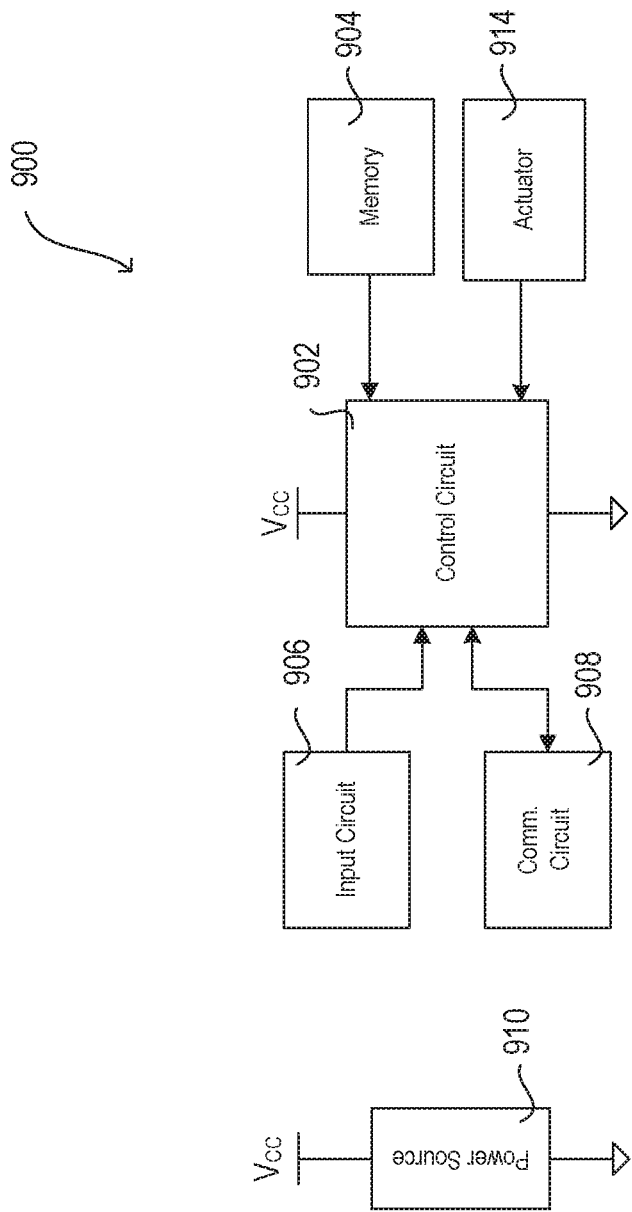
FIG. 9 is a block diagram of an example control-source device.

FIG. 9 is a block diagram illustrating an example control-source device 900 as described herein. The control-source device 900 may be a remote control device, an occupancy sensor, a daylight sensor, a window sensor, a temperature sensor, and/or the like. The control-source device 900 may include a control circuit 902 for controlling the functionality of the control-source device 900. The control circuit 902 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 902 may perform signal coding, data processing, power control, input/output processing, and/or any other functionality that enables the control-source device 900 to perform as described herein.

The control circuit 902 may be in communication with an actuator 914 (e.g., one or more buttons) that may be actuated by a user to communicate user selections to the control circuit 902. For example, the actuator 914 may be actuated to put the control circuit 902 in an association mode and/or communicate association messages from the control-source device 900. The actuator 914 may be actuated to communicate control instructions. The control circuit 902 may store information in and/or retrieve information from the memory 904. The memory 904 may include a non-removable memory and/or a removable memory, as described herein.

The control-source device 900 may include a communications circuit 908 for transmitting and/or receiving information. The communications circuit 908 may transmit and/or receive information via wired and/or wireless communications. The communications circuit 908 may include a transmitter, an RF transceiver, or other circuit capable of performing wired and/or wireless communications. The communications circuit 908 may be in communication with control circuit 902 for transmitting and/or receiving information.

The control circuit 902 may also be in communication with an input circuit 906. The input circuit 906 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the control-source device may receive input from the input circuit 906 to put the control circuit 902 in an association mode and/or communicate association messages from the control-source device. The control circuit 902 may receive information from the input circuit 906 (e.g. an indication that a button has been actuated or sensed information). Each of the modules within the control-source device 900 may be powered by a power source 910.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A method comprising:
receiving, at a product control application running on a programming device, association information comprising unique identifiers for a plurality of control devices in a load control system, wherein the plurality of control devices comprise a control-target device configured to directly control an electrical load in the load control system, and wherein the plurality of control devices comprise a control-source device configured to send messages configured to control the electrical load;
displaying, via a user interface of the product control application running on the programming device, the association information for each control device of the plurality of control devices;
receiving a selection of at least one of the plurality of control devices to be grouped for enabling the control-target device to respond to messages that include a group identifier, wherein the selection of the at least one of the plurality of control devices comprises: selection of both the control-source device and the control-target device, or selection of the control-source device and the control-target device is predefined;
defining an association between the selected control-source device and the control-target device for storage in a memory, wherein the association is defined to enable control of the electrical load by the control-target device based on subsequent messages received from the control-source device that include the group identifier; and
transmitting the defined association to at least one device in the load control system to enable assignment of the group identifier for messages communicated between the control-source device and the control-target device.

2. The method of claim 1, further comprising prompting a user, via the user interface of the product control application, to actuate a button on the control-source device to identify the control-source device by actuating the button on the control-source device.

3. The method of claim 1, the method further comprising:
in response to the defined association, selecting the group identifier at the at least one device in the load control system for the messages communicated between the control-source device and the control-target device.

4. The method of claim 3, wherein the at least one device further comprises a gateway device.

5. The method of claim 3, further comprising:
transmitting the group identifier to the control-source device and the control-target device after the selection of the group identifier.

6. The method of claim 5, further comprising:
entering a sleep mode at the control-source device after receiving the group identifier.

7. The method of claim 6, wherein the control-source device is a remote control device, and wherein the remote control device is configured to remain in the sleep mode until actuation of a button on the remote control device.

8. The method of claim 6, wherein the control-target device is a controllable light source.

9. The method of claim 3, wherein the group identifier is randomly generated at the at least one device.

10. The method of claim 1, wherein the control-target device is predefined for being associated with one or more control-source devices, and wherein the selection is received for the control-source device to be grouped with one or more other control-source devices and the control-target device.

11. The method of claim 1, further comprising:
receiving a selection of at least one second control device to be grouped for enabling a second control-target device to respond to messages that include a second group identifier, wherein the selection of at least one second control device comprises: selection of both a second control-source device and the second control-target device, or selection of the second control-source device and the second control-target device is predefined;
defining a second association between the selected second control-source device and the second control-target device for storage in the memory, wherein the association is defined to enable control of a second electrical load by the second control-target device based on subsequent messages received from the second control-source device that include the group identifier; and
transmitting the defined second association to the at least one device in the load control system to enable assignment of the second group identifier for messages communicated between the second control-source device and the second control-target device.

12. A load control system comprising:
a plurality of control devices, wherein the plurality of control devices comprise a control-target device configured to directly control an electrical load, and wherein the plurality of control devices comprise a control-source device configured to send messages configured to control the electrical load;
a programming device configured to:
receive, at a product control application, association information comprising unique identifiers for the plurality of control devices;
display, via a user interface of the product control application, the association information for each control device of the plurality of control devices;

receive a selection of at least one of the plurality of control devices to be grouped for enabling the control-target device to respond to messages that include a group identifier, wherein the selection of the at least one of the plurality of control devices comprises: selection of both the control-source device and the control-target device, or selection of the control-source device and the control-target device is predefined;

define an association between the selected control-source device and the control-target device for storage in a memory, wherein the association is defined to enable control of the electrical load by the control-target device based on subsequent messages received from the control-source device that include the group identifier; and transmit the defined association to at least one device in the load control system to enable assignment of the group identifier for messages communicated between the control-source device and the control-target device.

13. The load control system of claim 12, wherein the programming device is further configured to:

prompt a user, via the user interface of the product control application, to actuate a button on the control-source device to identify the control-source device by actuating the button on the control-source device.

14. The load control system of claim 12, further comprising the at least one device, wherein the at least one device is configured to:

in response to the defined association, select the group identifier for the messages communicated between the control-source device and the control-target device.

15. The load control system of claim 14, wherein the at least one device further comprises a gateway device.

16. The load control system of claim 14, wherein the at least one device is configured to transmit the group identifier to the control-source device and the control-target device after the selection of the group identifier.

17. The load control system of claim 16, wherein the control-source device is further configured to:

enter a sleep mode after receiving the group identifier.

18. The load control system of claim 17, wherein the control-source device is a remote control device, and wherein the remote control device is configured to remain in the sleep mode until actuation of a button on the remote control device.

19. The load control system of claim 17, wherein the control-target device is a controllable light source.

20. The load control system of claim 14, wherein the at least one device is configured to randomly generate the group identifier.

21. The load control system of claim 12, wherein the control-target device is predefined at the programming device for being associated with one or more control-source devices, and wherein the programming device is configured to receive the selection for the control-source device to be grouped with one or more other control-source devices and the control-target device.

22. The load control system of claim 12, wherein the programming device is further configured to:

receive a selection of at least one second control device to be grouped for enabling a second control-target device to respond to messages that include a second group identifier, wherein the selection of the at least one second control device comprises: selection of both a second control-source device and the second control-target device, or selection of the second control-source device and the second control-target device is predefined;

define a second association between the selected second control-source device and the second control-target device for storage in the memory, wherein the second association is defined to enable control of a second electrical load by the second control-target device based on subsequent messages received from the second control-source device that include the group identifier; and transmit the defined second association to the at least one device in the load control system to enable assignment of the second group identifier for messages communicated between the second control-target device and the second control-source device.

* * * * *